United States Patent
Zhu et al.

(10) Patent No.: US 11,005,268 B2
(45) Date of Patent: May 11, 2021

(54) OPTIMIZER, CONTROL METHOD AND PARALLEL ARRANGEMENT FOR PHOTOVOLTAIC SYSTEM

(71) Applicant: Delta Electronics, Inc., Taoyuan (CN)

(72) Inventors: Xuancai Zhu, Taoyuan (CN); Bingwen Weng, Taoyuan (CN); Jiao Zhang, Taoyuan (CN); Yanlong Li, Taoyuan (CN); Jinfa Zhang, Taoyuan (CN)

(73) Assignee: Delta Electronics, Inc., Taoyuan (CN)

( * ) Notice: Subject to any disclaimer, the term of this patent is extended or adjusted under 35 U.S.C. 154(b) by 84 days.

(21) Appl. No.: 16/361,840

(22) Filed: Mar. 22, 2019

(65) Prior Publication Data

US 2019/0326758 A1 Oct. 24, 2019

(30) Foreign Application Priority Data

Apr. 23, 2018 (CN) .......................... 201810367504.5

(51) Int. Cl.
| | |
|---|---|
| *H02M 3/156* | (2006.01) |
| *H02J 3/38* | (2006.01) |
| *H02M 1/08* | (2006.01) |
| *H02M 3/335* | (2006.01) |
| *H02S 40/32* | (2014.01) |

(52) U.S. Cl.
CPC .............. *H02J 3/385* (2013.01); *H02M 1/08* (2013.01); *H02M 3/33569* (2013.01); *H02S 40/32* (2014.12)

(58) Field of Classification Search
CPC .... H02M 3/285; H02M 1/08; H02M 3/33569; H02M 2001/0058; H02M 1/32; H02M 2001/0003; H02S 50/00; H02S 50/10; H02S 40/32; H02J 3/381; H02J 2300/26; H02J 3/385
See application file for complete search history.

(56) References Cited

U.S. PATENT DOCUMENTS

| | | | | |
|---|---|---|---|---|
| 9,184,594 | B2 * | 11/2015 | Garabandic | .............. H02S 40/34 |
| 2010/0071744 | A1 * | 3/2010 | Peurach | ............ H01L 31/02019 |
| | | | | 136/244 |
| 2010/0195361 | A1 * | 8/2010 | Stem | .................... H02M 7/5387 |
| | | | | 363/132 |
| 2012/0306279 | A1 * | 12/2012 | Garabandic | .............. H02S 40/34 |
| | | | | 307/85 |
| 2015/0016159 | A1 * | 1/2015 | Deboy | ..................... H02J 3/383 |
| | | | | 363/71 |
| 2015/0381108 | A1 * | 12/2015 | Hoft | ........................ H02S 50/00 |
| | | | | 136/244 |
| 2018/0131321 | A1 * | 5/2018 | Xu | ............................. H02J 3/12 |

(Continued)

FOREIGN PATENT DOCUMENTS

| | | |
|---|---|---|
| CN | 104079001 A | 10/2014 |
| CN | 106992554 A | 7/2017 |
| CN | 107154780 A | 9/2017 |

*Primary Examiner* — Jared Fureman
*Assistant Examiner* — Esayas G Yeshaw
(74) *Attorney, Agent, or Firm* — Qinghong Xu

(57) ABSTRACT

The present disclosure provides an optimizer for a photovoltaic system, a control method for an optimizer, and an optimizer parallel arrangement thereof. In the method, a DC bus voltage output by the optimizer is acquired; and the optimizer is controlled to switch among an MPPT mode, a limited power mode and a fast shutdown mode based on the DC bus voltage.

16 Claims, 12 Drawing Sheets

(56) References Cited

U.S. PATENT DOCUMENTS

| | | | | |
|---|---|---|---|---|
| 2018/0342873 A1* | 11/2018 | Wang | .................. | H02J 3/385 |
| 2019/0148947 A1* | 5/2019 | Mao | ..................... | G05F 1/67 |
| | | | | 307/78 |
| 2019/0173379 A1* | 6/2019 | Iwamatsu | ............ | H02M 3/156 |
| 2020/0059099 A1* | 2/2020 | Turena | ................ | H01L 31/05 |

* cited by examiner

OPTIMIZER, CONTROL METHOD AND PARALLEL ARRANGEMENT FOR PHOTOVOLTAIC SYSTEM

CROSS REFERENCE

This application is based upon and claims priority to Chinese Patent Application No. 201810367504.5, filed on Apr. 23, 2018, the entire contents thereof are incorporated herein by reference.

TECHNICAL FIELD

The present disclosure relates to circuit control technology, and particularly to an optimizer for a photovoltaic system, a control method for an optimizer, and a parallel arrangement of optimizers.

BACKGROUND

The photovoltaic power generation technology has been widely used all around the world. A photovoltaic power generation system includes a photovoltaic panel, a junction box, and an inverter. The photovoltaic panel converts solar energy into direct current (DC) electric power, and the inverter converts the DC electric power into required alternating current (AC) electric power, which is fed into the power grid or directly supplied to the user. Photovoltaic panels connected in series and in parallel output electric power to the inverter which outputs required AC electric power.

Conventionally, photovoltaic panels are connected in series or parallel and Maximum Power Point Tracking are performed to obtain a maximum power point as the input of the inverter. However, when some panels are covered, there will be consequences such as panel overheating, inaccurate tracking points, and etc. Moreover, when a high-voltage and high-power panel is disconnected, a threat to personal safety may occur. In addition, panels of the same specification have different maximum power points, and Maximum Power Point Tracking on the panels in series or in parallel may reduce the efficiency of the system. Also, conventional connection manner of photovoltaic panels has certain requirements for the installation position, and has the disadvantages of inflexible installation and inconvenient maintenance. An optimizer may be employed to flexibly install photovoltaic panels and perform Maximum Power Point Tracking on a single panel to improve conversion efficiency.

However, the optimizers are connected in series to achieve the connection between the high-voltage side of the DC bus and the input terminal of the inverter. In order to obtain sufficient high voltage for the DC bus to ensure the inverter work normally, the number of optimizers has to meet certain requirements. Moreover, communication with the inverter is essential for controlling the optimizer. In addition, conventionally, operational modes of the optimizers in series are switched based on detection of the output voltage of the optimizers. In such a case, if a panel to which an optimizer is connected is covered, the output voltage of the optimizer may be too low, which causes other optimizers to have an excessively high output voltage in order to share the load. Excessive output voltage may trigger over-voltage or under-voltage protection. And, due to the series arrangement, the shut-down optimizer may still have voltages in the internal or external components of the optimizer, which may be dangerous.

Therefore, there is a need to improve the optimizer of the conventional photovoltaic systems.

SUMMARY

According to an aspect of the present disclosure, there is provided a control method for an optimizer, which is applied for a photovoltaic system, an input terminal of the optimizer being connected to a power output terminal of a photovoltaic panel, and an output terminal of the optimizer being connected to an input terminal of an inverter by a DC bus, wherein the control method for the optimizer includes: acquiring a DC bus voltage output by the optimizer; and controlling the optimizer to switch among an Maximum Power Point Tracking mode, a limited power mode and a fast shutdown mode based on the DC bus voltage.

According to another aspect of the present disclosure, there is provided an optimizer applied in a photovoltaic system, an input terminal of the optimizer being connected a power output terminal of a photovoltaic panel, an output terminal of the optimizer being connected to an input terminal of an inverter via a DC bus, wherein the optimizer includes: a converter configured to convert electric power of the photovoltaic panel to DC electric power, an input terminal of the converter being connected to an input terminal of the optimizer, an output terminal of the converter being connected to an output terminal of the optimizer; and a controller configured to acquire a DC bus voltage output by the optimizer, and control the optimizer to switch among an MPPT mode, a limited power mode and a fast shutdown mode based on the DC bus voltage.

According to yet another aspect of the present disclosure, there is provided an optimizer parallel arrangement applied in a photovoltaic system, including a plurality of optimizers as described above; and output of each of the optimizers is connected to the DC output bus.

According to still another aspect of the present disclosure, there is provided a photovoltaic system, at least comprising an optimizer and a photovoltaic panel, an input terminal of the optimizer being connected a power output terminal of the photovoltaic panel, an output terminal of the optimizer being connected to an input terminal of an inverter via a DC bus, wherein the optimizer comprises: a converter configured to convert electric power of the photovoltaic panel to DC electric power, an input terminal of the converter being connected to an input terminal of the optimizer, an output terminal of the converter being connected to an output terminal of the optimizer; and a controller configured to acquire a DC bus voltage output by the optimizer, and control the optimizer to switch among an MPPT mode, a limited power mode and a fast shutdown mode based on the DC bus voltage.

BRIEF DESCRIPTION OF THE DRAWINGS

The above and other features and advantages of the present disclosure will become more apparent from the detailed description.

DETAILED DESCRIPTION

Figure 1:
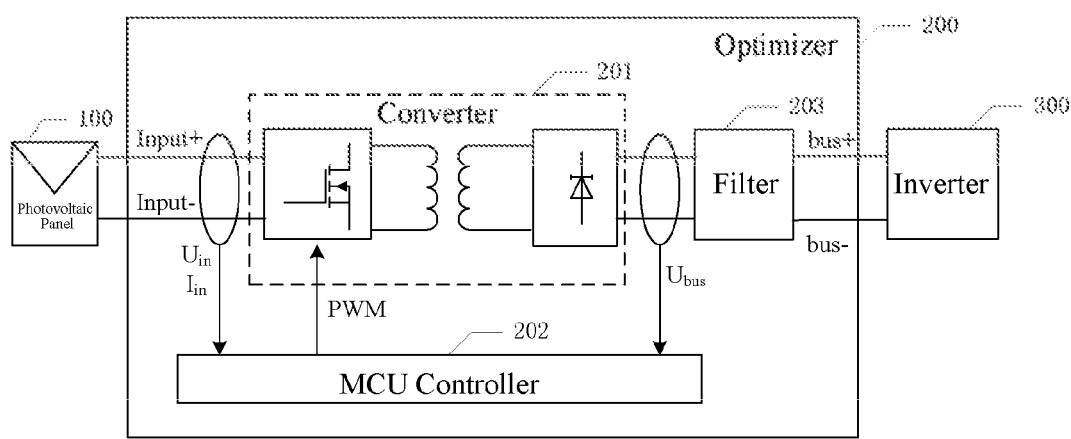
FIG. 1 is a block diagram illustrating a photovoltaic system according to an embodiment of the present disclosure.

Exemplary embodiments will now be described more fully with reference to the accompanying drawings. However, the exemplary embodiments can be implemented in a variety of forms, and should not be construed as being limited to the embodiments set forth herein. Rather, the embodiments are provided to make the present disclosure more complete and thorough, and to fully convey the concept of the exemplary embodiment to those skilled in the art. In the drawings, the size of the components may be exaggerated or modified for clarity. The same reference numerals in the drawings denote the same or similar structures, and thus their detailed description will be omitted.

Furthermore, the described features, structures, or characteristics may be combined in any suitable manner in one or more embodiments. In the following description, numerous specific details are set forth to give a thorough understanding of the embodiments of the present disclosure. However, those skilled in the art will appreciate that the technical solution of the present disclosure may be practiced without one or more of the specific details, or other methods, elements, and the like may be employed. In other instances, well-known structures, methods, or operations are not shown or described in detail to avoid obscuring aspects of the present disclosure.

The object of the present disclosure is to provide an optimizer, a control method for an optimizer and an optimizer parallel arrangement for a photovoltaic system, which can switch the operation mode of the inverter depending on different inverter output voltages, and solve the common mode leakage current problem caused by the photovoltaic panel, and achieve soft switching and improve efficiency for all power devices. Moreover, the voltage of the entire photovoltaic system can be controlled by the inverter, so that the entire system, including the roof photovoltaic panel, is in a safe state when necessary. At the same time, the distributed arrangement can improve electricity generation revenue of the entire system.

FIG. 1 is a block diagram illustrating a photovoltaic system having an optimizer according to an embodiment of the present disclosure. The photovoltaic system includes a photovoltaic (PV) panel 100, an optimizer 200 and an inverter 300.

The optimizer 200 has a positive voltage input terminal Input+ and a negative voltage input terminal Input- respectively connected to positive and negative power output terminals of the photovoltaic panel 100, and has an output terminal connected to an input terminal of the inverter 300 via a positive DC bus bus+ and a negative DC bus bus-. The optimizer 200 includes a converter 201 and an MCU controller 202. The converter 201 converts the electric power of the photovoltaic panel 100 into direct current electric power, and has an input terminal connected to an input terminal of the optimizer 200, and an output terminal connected to the output terminal of the optimizer 200. The MCU controller 202 acquires the DC bus voltage $U_{bus}$ output by the optimizer 200 and control the optimizer 200 to switch among an MPPT mode, a limited power mode, and a fast shutdown mode based on the DC bus voltage $U_{bus}$. In addition, the MCU controller 202 acquires an input voltage $U_{in}$ and an input current $I_{in}$ of the optimizer 200 for generating a pulse width modulation (PWM) signal and controls the turning on and off of switches of the converter via a drive circuit. Moreover, when it is detected that the output DC bus voltage $U_{bus}$ is not within the normal operating voltage range, the fast shutdown mode is enabled, and the optimizer 200 is disconnected.

In addition, the optimizer 200 may further include a filter 203 and the DC electric power output from the converter 201 is filtered by the filter 203. Further, the filter 203 may also be disposed outside the optimizer 200, but is not limited thereto.

Figure 2:
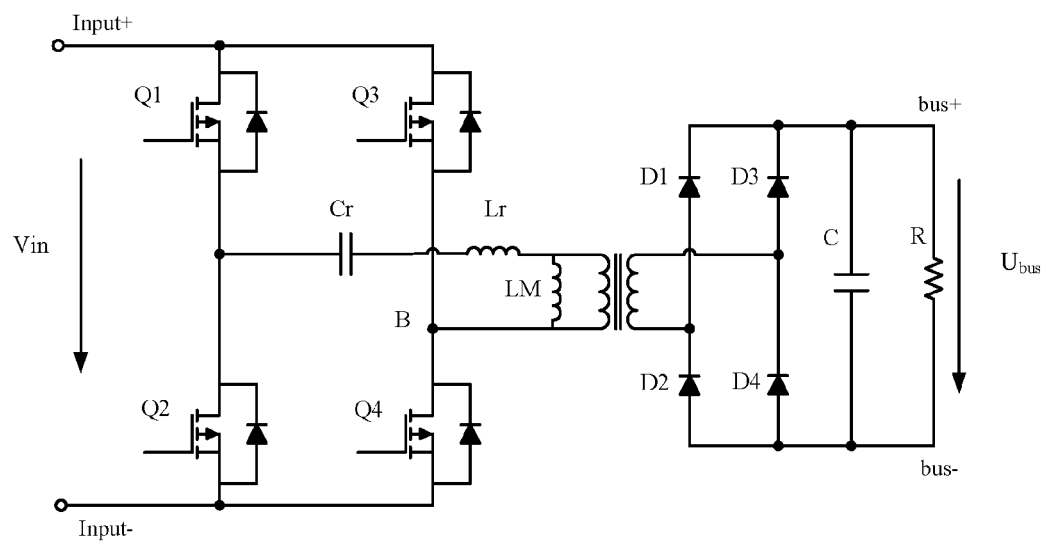
FIG. 2 illustrates an exemplary circuit arrangement of a converter according to an embodiment of the present disclosure.

FIG. 2 shows an exemplary converter circuit in a form of an isolated topology full bridge LLC circuit. The converter has a primary side including a full bridge circuit composed of controlled switches Q1, Q2, Q3, and Q4, and an LLC resonant circuit composed of a resonant capacitor Cr, a resonant inductor Lr, and a magnetizing inductor LM and a secondary side including a full bridge circuit composed of diodes D1, D2. D3, and D4, and a filter capacitor C. The resistor R is equivalent to the load of the optimizer. A bus voltage $U_{bus}$ is formed between the positive DC bus bus+ and the negative DC bus bus- across the capacitor C.

The converter circuit of FIG. 2 regulates the output voltage of the primary side full bridge in a phase shifting way. The secondary side generates a final DC bus voltage $U_{bus}$ by a diode rectification circuit and filtering operations. The switching timings of the MOSFET switches Q1 and Q2 are complementary, and the switching timings of the MOSFET switches Q3 and Q4 are complementary. The output voltage of the primary side is adjusted by adjusting the phase shift angle between Q1 and Q4. In this topology, the full bridge circuit formed by MOSFETs Q1 to Q4 can realize zero voltage switching (ZVS), and the full bridge circuit formed by diodes D1 to D4 can realize zero current switching (ZCS). In addition, the LLC resonant circuit applies a pulse frequency modulation method in which the magnitude of the output DC bus voltage is adjusted by adjusting the switching frequency.

Figure 3:
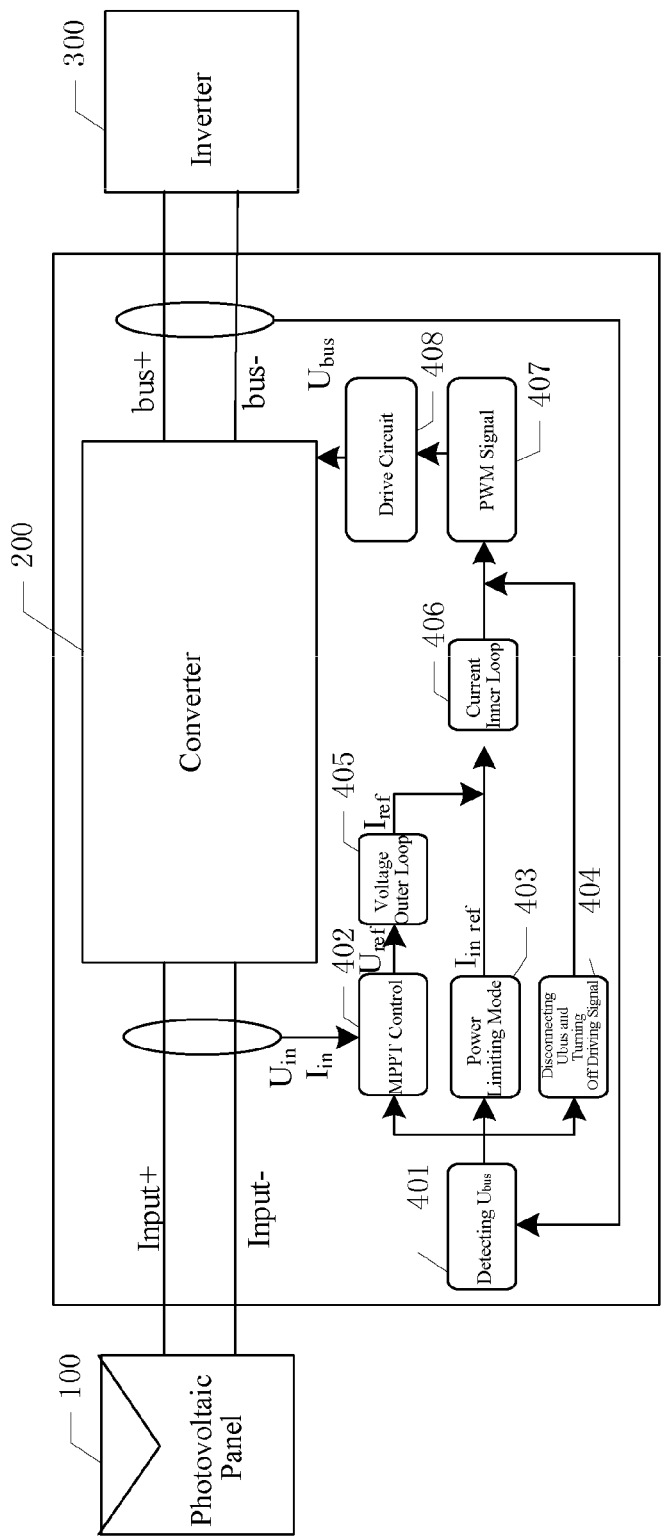
FIG. 3 is a block diagram illustrating a control logic for an optimizer according to an embodiment of the present disclosure.

The control method for the optimizer according to the embodiment of the present disclosure will now be described in conjunction with the block diagram of optimizer control in FIG. 3.

The input and output terminals of the optimizer are connected to the photovoltaic panel 100 and the inverter 300, respectively. The controller detects the DC bus voltage $U_{bus}$ output by the converter 200 in step 401, and determines that the converter 201 of the optimizer 200 operates in one of the MPPT control mode 402, the power limiting mode 403, and the fast shutdown mode 404 which is a state disconnecting from the DC bus according to the value range of the $U_{bus}$. When it is determined that the optimizer 200 operates in the MPPT control mode 402 according to the detected DC bus voltage $U_{bus}$, the input voltage $U_{in}$ and the input current $U_{in}$ are acquired and fed to the controller for the MPPT control; and a reference voltage $U_{ref}$ is generated based on the DC bus voltage $U_{bus}$, and fed into a voltage outer loop 405 to be compared with the input voltage Uin, and a reference current $I_{ref}$ is generated based the calculation result of the voltage outer loop 405. Then, the reference current is taken as a reference current of a current inner loop 406 and is compared with the input current $I_{in}$ in the current inner loop 406, and a driving signal, such as a duty ration of pulse width modulation signal (PWM signal) 407, is generated according to the comparison result. The PWM signal passes through the drive circuit 408 to be used to control the turn-on and turn-off of the switch in the converter, and in turn, to control the output power. When it is detected that the state of the optimizer 200 is in the power limited mode 403, a reference current $I_{in\_ref}$ is directly set, and the reference current $I_{in\_ref}$ is taken as the reference current $I_{ref}$ of the current inner loop 406 to determine the duty ratio of the PWM signal 407, to realize control of the output power of the optimizer 200. When it is detected that the optimizer 200 is in an under-voltage or over-voltage state, the optimizer 200 is in the fast shutdown mode 404, the PWM signal 407 is directly set to a low level, so that the optimizer 200 is disconnected from the DC bus voltage $U_{bus}$.

In the current inner loop, a parameter of the PWM pulse signal is generated based on the difference between the reference current $I_{ref}$ and the input current $I_{in}$, and the difference includes, but is not limited to, an arithmetic difference, a variance, a mean square error, and the like. Similarly, in the voltage outer loop, a parameter of the reference current $I_{ref}$ is generated based on the difference between the input voltage $U_{in}$ and the reference voltage $U_{ref}$, and the difference includes, but is not limited to, an arithmetic difference, a variance, a mean square error, and the like.

Figure 4:
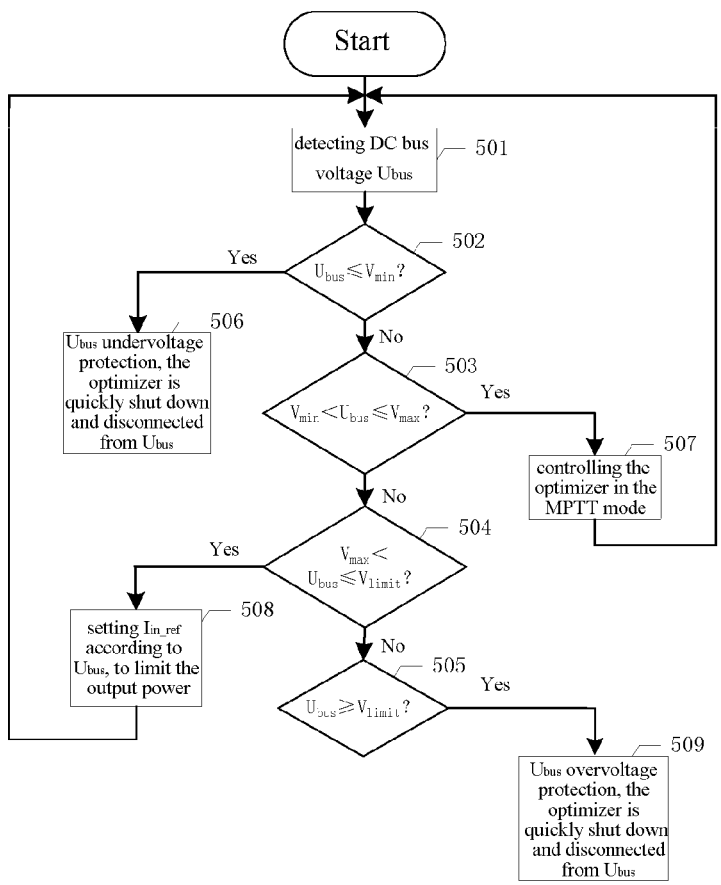
FIG. 4 is a flow chart illustrating selection of an operation mode for an optimizer according to an embodiment of the present disclosure.

FIG. 4 shows how to determine which operation mode the optimizer operates according to the DC bus voltage $U_{bus}$. The optimizer of the embodiment of the present disclosure does not need to communicate with the inverter to control the operating state of the optimizer, and can determine the operation mode of the optimizer merely by detecting the range of the DC bus voltage $U_{bus}$. The specific detection process is as follows.

First, the DC bus voltage $U_{bus}$ is detected in step 501.

Next, in step 502, the relationship between $U_{bus}$ and $V_{min}$ is determined. When $U_{bus}<=V_{min}$ holds, the process proceeds to step 506, and the optimizer is in the fast shutdown mode. At this time, the under-voltage protection is performed, the optimizer is disconnected from the DC bus and the control of the optimizer ends; when $U_{bus}<=V_{min}$ does not hold, the process proceeds to the next step 503.

In step 503, when $V_{min}<U_{bus}\leq V_{max}$ holds, the process proceeds to step 507, the optimizer is in the MPPT control mode, and after the MPPT control is completed, the process returns to the step 501; when $V_{min}<U_{bus}\leq V_{max}$ does not hold, the process proceeds to the next step 504.

In step 504, when $V_{max}<U_{bus}\leq V_{limit}$ holds, then the process proceeds to step 508, the optimizer is in the limited power mode, and after the control in this mode is completed, the process returns to step 501; when $V_{max}<U_{bus}\leq V_{limit}$ does not hold, the process proceeds to the next step 505.

In step 505, when $V_{limit}<U_{bus}$ holds, the process proceeds to step 509, the optimizer is in the fast shutdown mode, at this time the over-voltage protection is performed, and the optimizer is disconnected from the DC bus and the control of the optimizer ends.

Where $V_{min}$ is a first voltage limit and represents the lowest voltage of the operating voltage range of the optimizer, $V_{max}$ is a second voltage limit which is greater than $V_{min}$, and represents the highest voltage of the optimizer in the MPPT control mode, and $V_{limit}$ is a third voltage limit which is greater than $V_{max}$ and represents the highest voltage of the operating voltage range of the optimizer.

Figure 5:
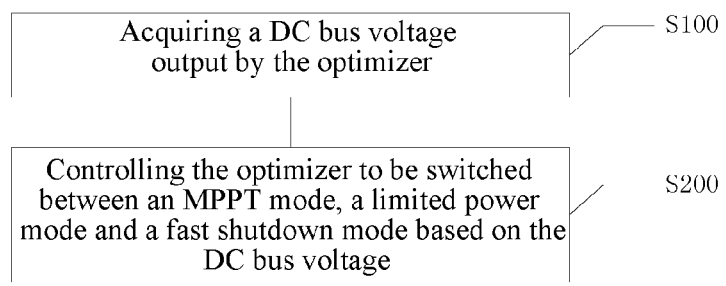
FIG. 5 is a flow chart illustrating a control method for an optimizer according to an embodiment of the present disclosure.

The control method for the optimizer according to an embodiment of the present disclosure includes the following steps as shown in FIG. 5.

In S100, a DC bus voltage output by the optimizer is acquired.

In S200, based on the DC bus voltage, the optimizer is controlled to switch among the MPPT mode, the limited power mode and the fast shutdown mode.

Figure 6:
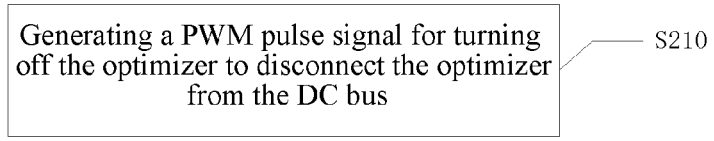
FIG. 6 is a flow chart illustrating specific steps of a control method for an optimizer according to an embodiment of the present disclosure.

According to an embodiment, if the DC bus voltage is lower than the first voltage limit or higher than the third voltage limit, the optimizer is controlled to operate in the fast shutdown mode, and at this time the step S200 further includes the following steps shown in FIG. 6.

In S210, a PWM pulse signal for turning off the optimizer is generated to make the optimizer to be disconnected from the DC bus.

Figure 7:
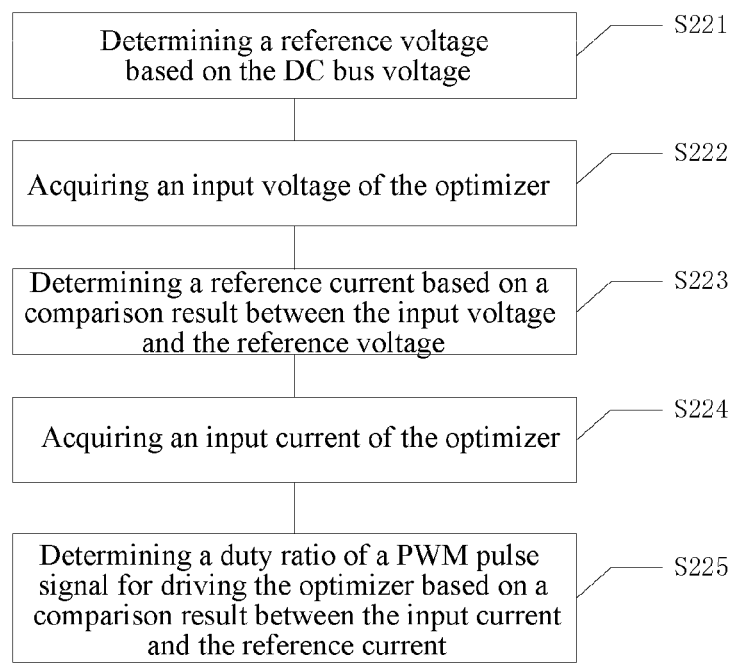
FIG. 7 is a flow chart illustrating specific steps of a control method for an optimizer according to an embodiment of the present disclosure.

According to an embodiment, if the DC bus voltage is higher than the first voltage limit and lower than the second voltage limit, the optimizer is controlled to operate in the MPPT mode, in which the second voltage limit is lower than the third voltage limit, and the step S200 further includes the following steps as shown in FIG. 7.

In S221, a reference voltage is determined based on the DC bus voltage.

In S222, an input voltage of the optimizer is acquired.

In S223: a reference current is determined based on a comparison result between the input voltage and the reference voltage.

In S224: an input current of the optimizer is acquired.

In S225, a duty ratio of a PWM pulse signal used to drive the optimizer is determined based on a comparison result between the input current and the reference current.

Figure 8:
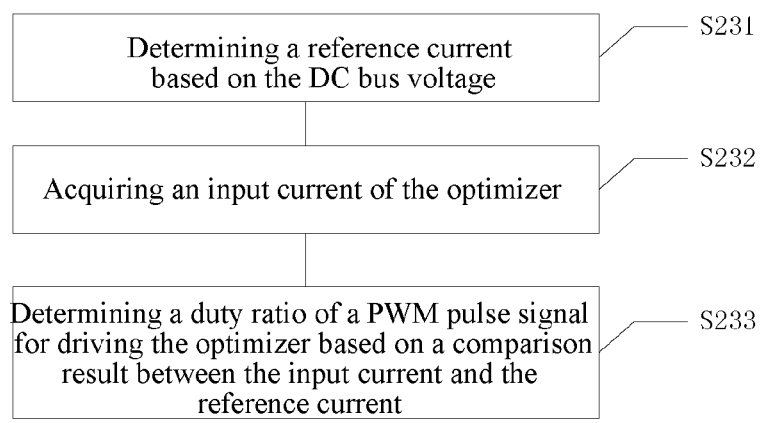
FIG. 8 is a flow chart illustrating specific steps of a control method for an optimizer according to an embodiment of the present disclosure.

According to an embodiment, if the DC bus voltage is higher than the second voltage limit and lower than the third voltage limit, the optimizer is controlled to operate in the limited power mode, and step S200 further includes the following steps as shown in FIG. 8.

In S231, a reference current is determined based on the DC bus voltage.

In S232, an input current of the optimizer is acquired.

In S233, a duty ratio of the PWM pulse signal used to drive the optimizer is determined based on a comparison result between the input current and the reference current.

In addition, when multiple optimizers are used, the outputs of these optimizers may be connected in parallel and then fed to the DC bus.

Figure 9:
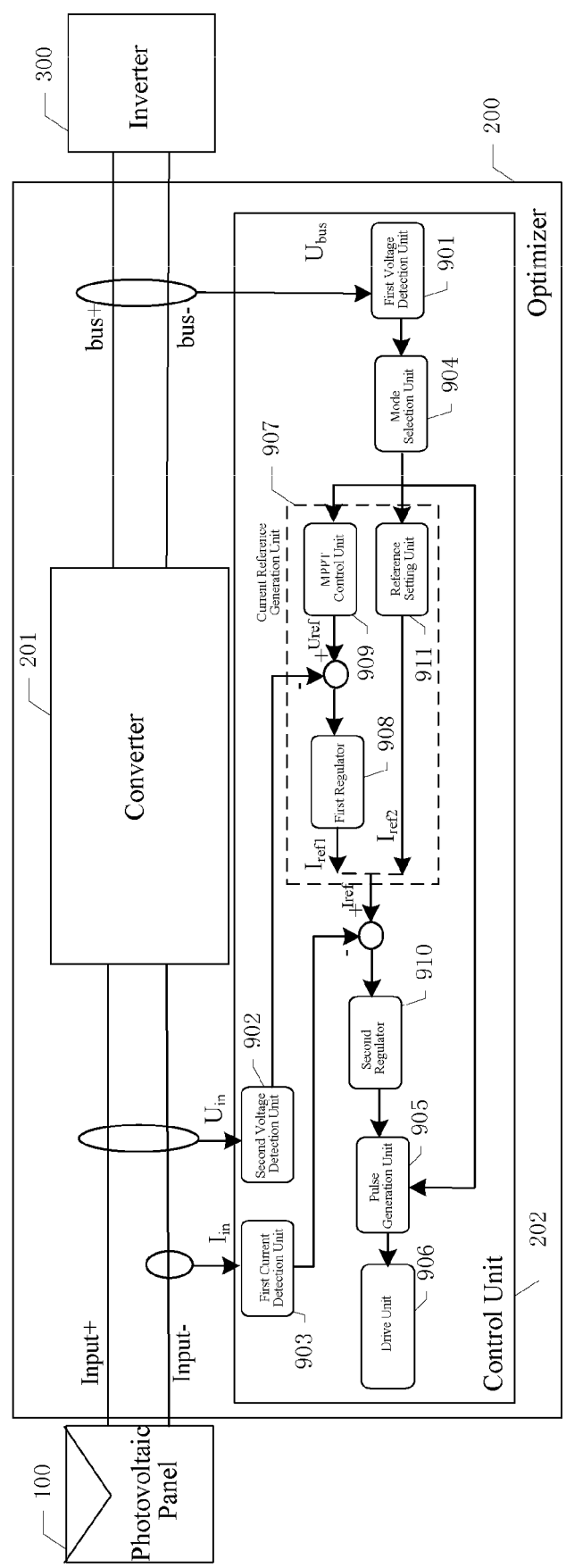
FIG. 9 is a block diagram illustrating an optimizer according to an embodiment of the present disclosure.

An optimizer for a photovoltaic system according to an embodiment of the present disclosure will now be described with reference to FIG. 9. The same parts as those in FIG. 1 will not be repeated.

The controller 202 of the optimizer 200 includes a first voltage detection unit 901, a second voltage detection unit 902, a first current detection unit 903, a mode selection unit 904, a pulse generation unit 905, and a drive unit 906. The first voltage detection unit 901 is configured to acquire the DC bus voltage $U_{bus}$. The second voltage detection unit 902 is configured to acquire the input voltage $U_{in}$ of the optimizer 200. The first current detection unit 903 is configured to acquire the input current $I_{in}$ of the optimizer 200. The mode selection unit 904 is configured to control the optimizer 200 to switch among the MPPT mode, the limited power mode, and the fast shutdown mode based on the DC bus voltage $U_{bus}$. The pulse generation unit 905 is configured to generate a PWM pulse signal that turns off or on the optimizer 200. The drive unit 906 is configured to turn off or on the optimizer 200 based on the PWM pulse signal.

For the mode selection unit 904, referring to the flowchart of the step as shown in FIG. 4, if the DC bus voltage $U_{bus}$ is lower than the first voltage limit or higher than the third voltage limit, the optimizer 200 is controlled to operate in a fast shutdown mode; if the DC bus voltage $U_{bus}$ is higher than the first voltage limit and lower than the second voltage limit, the optimizer 200 is controlled to operate in the MPPT mode; if the DC bus voltage $U_{bus}$ is higher than the second voltage limit and lower than the third voltage limit, the optimizer 200 is controlled to operate in the limited power mode.

According to an embodiment of the present disclosure, the controller 202 further includes a current reference generation unit 907 and a second regulator 910. The current reference generation unit 907 is configured to generate a reference current $I_{ref}$ based on the DC bus voltage $U_{bus}$ and the input voltage $U_{in}$ in the MPPT mode and the limited power mode. The second regulator 910 is configured to generate a PWM pulse signal for driving the optimizer 200 based on the reference current $I_{ref}$ and the input current $I_{in}$. For example, a PWM pulse signal is generated based on a difference between the reference current $I_{ref}$ and the input current $I_{in}$. The difference includes but is not limited to arithmetic difference, variance, mean square error, and the like.

According to an embodiment, the current reference generation unit 907 further includes an MPPT control unit 909 and a first regulator 908. The MPPT control unit 909 is configured to generate a reference voltage $U_{ref}$ based on the DC bus voltage $U_{bus}$ in the MPPT mode. The first regulator 908 is configured to generate a reference current $I_{ref1}$ based on a comparison result between the input voltage $U_{in}$ and the reference voltage $U_{ref}$ in the MPPT mode, and the reference current $I_{ref1}$ may be taken as the reference current $I_{ref}$ of the second regulator 910. For example, the reference current $I_{ref1}$ is generated based on the difference between the input voltage $U_{in}$ and the reference voltage $U_{ref}$. The difference includes but is not limited to arithmetic difference, variance, mean square error, and the like.

For the first regulator 908 and the second regulator 910, a proportional-integral-derivative (PID) control scheme may be employed. For the pulse generation unit 905, a PWM signal is generated in a mode other than the fast shutdown mode, or a PWM signal that turns off the optimizer is generated in the fast shutdown mode.

According to another embodiment, the current reference generation unit 907 further includes a reference setting unit 911 configured to generate a reference current $I_{ref2}$ based on the DC bus voltage $U_{bus}$ in the power limited mode. The reference current $I_{ref2}$ may be taken as the reference current $I_{ref}$ of the second regulator 910.

For the fast shutdown mode, the mode selection unit 904 may also directly generate a PWM pulse signal for turning off the optimizer 200.

Figure 10:
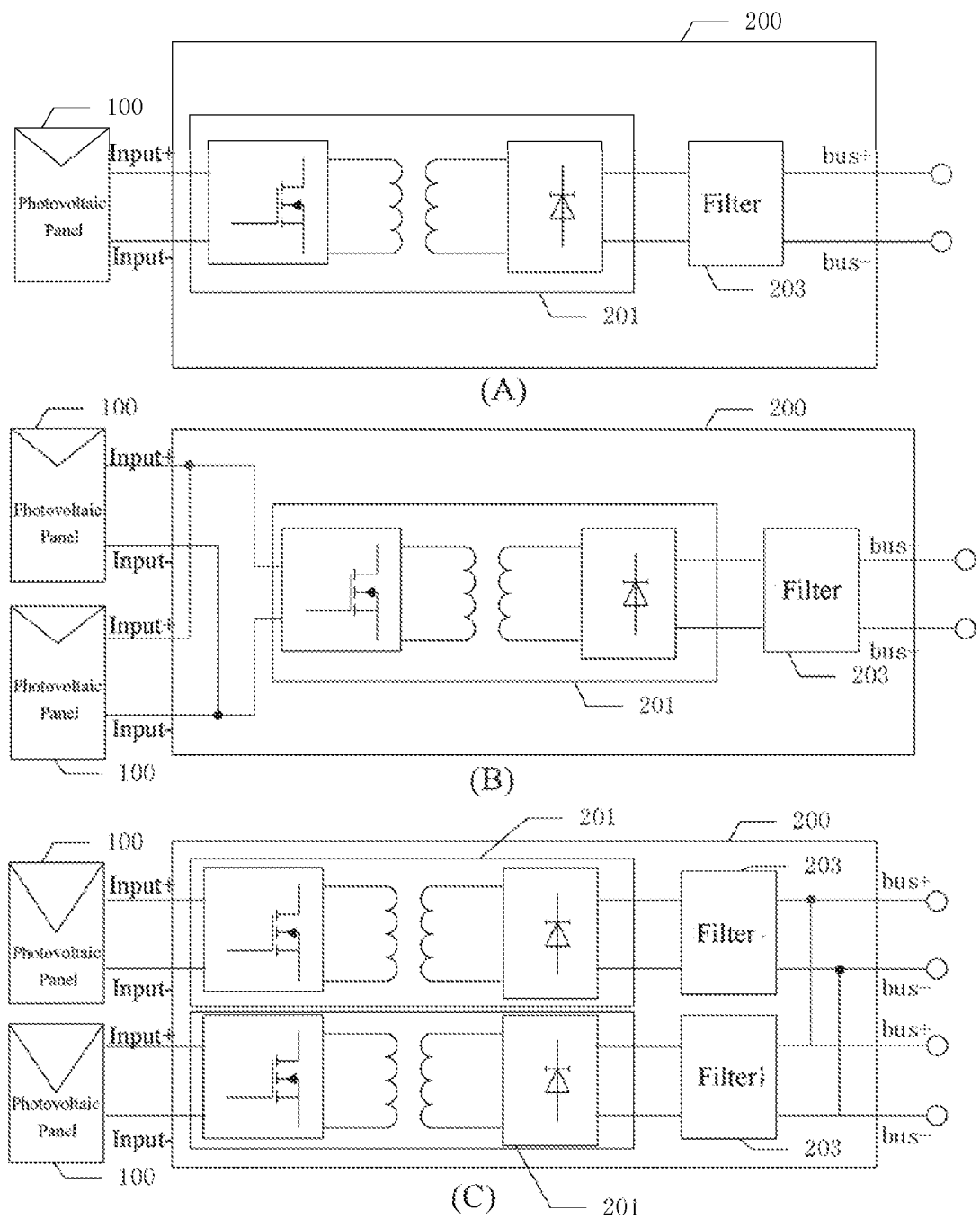
FIG. 10 is a diagram illustrating an internal parallel arrangement of an optimizer according to an embodiment of the present disclosure.

(A), (B), and (C) in FIG. 10 respectively show three connection modes of the photovoltaic panel 100 and the optimizer 200. FIG. 10 (A) is a single input single output type. FIG. 10 (B) is a double input single output type, and the two input branches are connected in parallel internally as the input of the optimizer 200. FIG. 10 (C) is a double input double output type, and the two output branches are connected in parallel inside the optimizer 200 as the output of the optimizer 200. Each input branch of the optimizer 200 includes a positive voltage input terminal Input+ and a negative voltage input terminal Input−, and the output branch includes a positive output bus bus+ and a negative output bus bus−, respectively. The circuit arrangement and control mode of the optimizer 200 are as shown in FIGS. 1-9, and will not be described in detail herein.

When the optimizer of FIGS. 1-9 is applied to a photovoltaic power generation system, the arrangement in which the optimizer is connected in parallel can be used. The optimizer parallel arrangement for a photovoltaic power generation system will now be described with reference to FIGS. 11 and 12.

Figure 11:
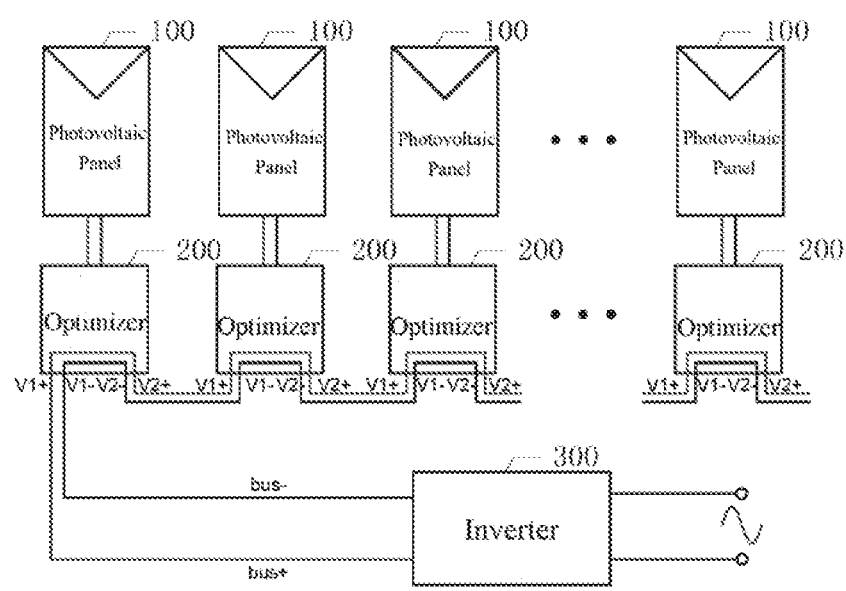
FIG. 11 is a diagram illustrating a parallel arrangement of an optimizer according to an embodiment of the present disclosure.

An arrangement in which a plurality of optimizers 200 are connected in parallel is shown in FIG. 11. Each optimizer 200 corresponds to one photovoltaic panel 100. The plurality of optimizers 200 are connected in parallel to obtain a DC high voltage, which is input to the inverter 300 and converted to the required AC electric power by the inverter 300. Depending on the power demanded by the user, several optimizers 200 may be flexibly connected in parallel. In the case when part of the photovoltaic panels 100 are covered, the optimizers 200 with parallel outputs can be turned off in response to a detection of abnormality of the bus voltage, without affecting the operation of the other optimizers 200, and no optimizers 200 which are turned off still has flowing current.

The output of each optimizer 200 is connected to the positive output bus bus+ and the negative output bus bus− of the DC output bus, respectively. Each optimizer 200 has a first positive terminal V1+, a second positive terminal V2+, a first negative terminal V1− and a second negative terminal V2−. The first positive terminal V1+ is connected to the positive output bus bus+ of the DC output bus, the first negative terminal V1− is connected to the negative output bus bus− of the DC output bus, the first positive terminal V1+ is connected to the first positive terminal V1+ of the other optimizer 200 via the second positive terminal V2+ inside the optimizer 200, and the first negative terminal V1− is connected to the first negative terminal V1− of the other optimizer 200 via the second negative terminal V2− inside the optimizer 200.

Figure 12:
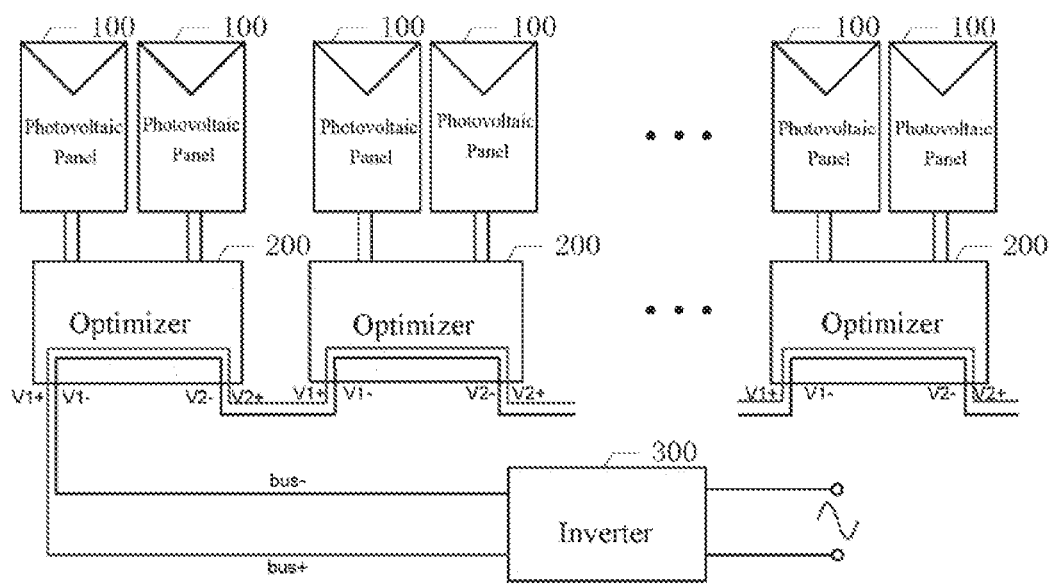
FIG. 12 is a diagram showing a parallel arrangement of an optimizer according to another embodiment of the present disclosure.

FIG. 12 shows another arrangement in which a plurality of optimizers 200 are connected in parallel. Different from FIG. 11, each optimizer 200 corresponds to two photovoltaic panels 100. Each optimizer 200 may also correspond to more photovoltaic panels 100 depending on actual needs. For the input and output arrangement of the optimizer 200 in this case, refer to the input and output arrangement of the optimizer 200 as shown in FIG. 10 (B) or (C). Connection manner of the first positive terminal V1+, the second positive terminal V2+, the first negative terminal V1− and the second negative terminal V2− of the optimizer 200 and the positive output terminal bus+ and the negative output terminal bus− of the DC output bus is similar to FIG. 11, and will not be described in detail here.

The optimizer for the photovoltaic system, the control method for the optimizer and the optimizer parallel arrangement thereof of the embodiments of the present disclosure can control the optimizer to switch among the MPPT mode, the limited power mode and the fast shutdown mode merely by acquiring the DC bus voltage output by the inverter, without additional communication path between the inverter and the optimizer. Only by detecting the DC output bus voltage of the optimizer, the operation modes of the optimizer can be completed without affecting other optimizer to output power to the inverter. The isolated topology is used to improve the common mode leakage current caused by the photovoltaic panel. All power devices in the phase-shifted full-bridge LLC topology can achieve advantages of soft switching and high efficiency.

The present disclosure has been described by the above-described related embodiments, but the above embodiments are merely examples for implementing the present disclosure. It must be noted that the disclosed embodiments do not limit the scope of the disclosure. On the contrary, variations and modifications made without departing from the spirit and scope of the disclosure are the scope of the disclosure.

What is claimed is:

1. A control method for an optimizer, which is applied for a photovoltaic system, an input terminal of the optimizer being connected to an output terminal of a photovoltaic panel, and an output terminal of the optimizer being connected to an input terminal of an inverter by a DC bus, the control method comprising:
    acquiring a DC bus voltage output by the optimizer; and
    controlling the optimizer to switch among an MPPT mode, a limited power mode and a fast shutdown mode based on the DC bus voltage;
    wherein when the DC bus voltage is lower than a first voltage limit or higher than a third voltage limit, controlling the optimizer to operate in the fast shutdown mode;
    wherein when the DC bus voltage is higher than a first voltage limit and lower than a second voltage limit, controlling the optimizer to operate in the MPPT mode, wherein the second voltage limit is lower than a third voltage limit;
    wherein when the DC bus voltage is higher than a second voltage limit and lower than a third voltage limit, controlling the optimizer to operate in the limited power mode.

2. The control method for the optimizer according to claim 1, wherein in the fast shutdown mode, a PWM pulse signal for turning off the optimizer is generated to disconnect the optimizer from the DC bus.

3. The control method for the optimizer according to claim 1, further comprising, in the MPPT mode:
    determining a reference voltage based on the DC bus voltage;
    acquiring an input voltage of the optimizer;
    determining a reference current based on a comparison result between the input voltage and the reference voltage;
    acquiring an input current of the optimizer; and
    determining a duty ratio of a PWM pulse signal for driving the optimizer based on a comparison result between the input current and the reference current.

4. The control method for the optimizer according to claim 1, further comprising, in the limited power mode:
    determining a reference current based on the DC bus voltage;
    acquiring an input current of the optimizer; and
    determining a duty ratio of a PWM pulse signal for driving the optimizer based on a comparison result between the input current and the reference current.

5. The control method for the optimizer according to claim 1, wherein outputs of a plurality of the optimizers are connected in parallel to the DC bus.

6. The control method for the optimizer according to claim 1, wherein the first voltage limit is a lowest voltage of an operating voltage range of the optimizer, and the second voltage limit is a highest voltage at which the optimizer operates in the MPPT mode, and the third voltage limit is a highest voltage of the operating voltage range of the optimizer.

7. An optimizer applied in a photovoltaic system, an input terminal of the optimizer being connected a power output terminal of a photovoltaic panel, an output terminal of the optimizer being connected to an input terminal of an inverter via a DC bus, wherein the optimizer comprises:
    a converter configured to convert electric power of the photovoltaic panel to DC electric power, an input terminal of the converter being connected to an input terminal of the optimizer, an output terminal of the converter being connected to an output terminal of the optimizer; and
    a controller configured to acquire a DC bus voltage output by the optimizer, and control the optimizer to switch among an MPPT mode, a limited power mode and a fast shutdown mode based on the DC bus voltage;
    wherein the controller comprises: a mode selection unit configured to control the optimizer to switch among the MPPT mode, the limited power mode and the fast shutdown mode based on the DC bus voltage;
    wherein the mode selection unit is further configured to:
        control the optimizer to operate in the fast shutdown mode when the DC bus voltage is lower than a first voltage limit or higher than a third voltage limit;
        control the optimizer to operate in the MPPT mode when the DC bus voltage is higher than the first voltage limit and lower than a second voltage limit; and
        control the optimizer to operate in the limited power mode when the DC bus voltage is higher than the second voltage limit and lower than the third voltage limit.

8. The optimizer according to claim 7, wherein the controller comprises:
    a first voltage detection unit configured to acquire the DC bus voltage;
    a second voltage detection unit configured to acquire an input voltage of the optimizer;
    a first current detection unit configured to acquire an input current of the optimizer;
    a pulse generation unit configured to generate a PWM pulse signal for turning off or on the optimizer; and
    a drive unit configured to turn off or drive the optimizer based on the PWM pulse signal.

9. The optimizer according to claim 7, wherein the controller further comprises:
    a current reference generation unit configured to generate a reference current based on the DC bus voltage and the input voltage in the MPPT mode and the power limited mode; and
    a second regulator configured to generate a PWM pulse signal for driving the optimizer based on the reference current and the input current.

10. The optimizer according to claim 9, wherein the current reference generation unit comprises:

an MPPT control unit configured to generate a reference voltage based on the DC bus voltage in the MPPT mode; and a first regulator configured to generate a reference current based on a comparison result between the input voltage and the reference voltage in the MPPT mode.

11. The optimizer according to claim 9, wherein the current reference generation unit comprises:

a reference setting unit configured to generate a reference current based on the DC bus voltage in the limited power mode.

12. The optimizer according to claim 8, wherein the mode selection unit is further configured to generate a PWM pulse signal for turning off the optimizer in the fast shutdown mode.

13. The optimizer according to claim 7, wherein the first voltage limit is a lowest voltage of an operating voltage range of the optimizer, and the second voltage limit is a highest voltage at which the optimizer operates in the MPPT mode and the third voltage limit is a highest voltage of the operating voltage range of the optimizer.

14. An optimizer parallel arrangement applied in a photovoltaic system, comprising a plurality of optimizers according to claim 7, wherein outputs of the plurality of optimizers are connected to the DC output bus.

15. The optimizer parallel arrangement according to claim 14, wherein each of the plurality of optimizers includes a first positive terminal, a second positive terminal, a first negative terminal and a second negative terminal, wherein the first positive terminal of each optimizer is connected to a positive output bus of the DC output bus, the first negative terminal is connected to a negative output bus of the DC output bus, the first positive terminal is connected to the first positive terminal of another optimizer via the second positive terminal inside the optimizer, and the first negative terminal is connected to the first negative terminal of another optimizer via the second negative terminal inside the optimizer.

16. A photovoltaic system, at least comprising an optimizer and a photovoltaic panel, an input terminal of the optimizer being connected a power output terminal of the photovoltaic panel, an output terminal of the optimizer being connected to an input terminal of an inverter via a DC bus, wherein the optimizer comprises:

a converter configured to convert electric power of the photovoltaic panel to DC electric power, an input terminal of the converter being connected to an input terminal of the optimizer, an output terminal of the converter being connected to an output terminal of the optimizer; and a controller configured to acquire a DC bus voltage output by the optimizer, and control the optimizer to switch among an MPPT mode, a limited power mode and a fast shutdown mode based on the DC bus voltage;

wherein the controller comprises a mode selection unit is further configured to:

control the optimizer to operate in the fast shutdown mode when the DC bus voltage is lower than a first voltage limit or higher than a third voltage limit;

control the optimizer to operate in the MPPT mode when the DC bus voltage is higher than the first voltage limit and lower than a second voltage limit; and control the optimizer to operate in the limited power mode when the DC bus voltage is higher than the second voltage limit and lower than the third voltage limit.

* * * * *